United States Patent [19]
Shih et al.

[11] Patent Number: 5,267,269
[45] Date of Patent: Nov. 30, 1993

[54] SYSTEM AND METHOD EMPLOYING PREDETERMINED WAVEFORMS FOR TRANSMIT EQUALIZATION

[75] Inventors: Cheng-chung Shih, Rancho Cordova; Haim Shafir, Sacramento; Stefan M. Wurster, El Dorado Hills; Cecil Aswell, Orangevale; Daniel L. Ray, Fair Oaks; Joseph E. Heideman, Orangevale, all of Calif.

[73] Assignee: Level One Communications, Inc., Folsom, Calif.

[21] Appl. No.: 754,604

[22] Filed: Sep. 4, 1991

[51] Int. Cl.$^5$ .......................................... H04L 25/49
[52] U.S. Cl. .................................... 375/60; 178/69 N
[58] Field of Search ............................. 375/60, 55, 58; 178/69 N; 328/162; 332/107, 123; 307/261, 264, 265; 455/63

[56] References Cited

U.S. PATENT DOCUMENTS

| 4,644,565 | 2/1987 | Seo et al. | 375/60 |
| 4,748,346 | 5/1988 | Emori | 307/270 |
| 5,107,520 | 4/1992 | Karam et al. | 375/60 |

OTHER PUBLICATIONS

NCR92C02 Ethernet Twisted-Pair Transceiver, 1989, NCR Corporation, Dayton, Ohio.
T7220 Twisted-Pair Medium Attachment Unit (TPMAU), Apr. 1989, Robert C. Yu, AT&T Micro Electronics, Sunnyvale, Calif.
T7240 Twisted-Pair Port Transceiver (TPORT) Issue 2, Aug. 1989, AT&T.
ML4653 10Base-T Transceiver for Multi-Port Repeaters, Sep. 1989, Micro Linear Corporation.
Am79C98 Twisted-Pair Ethernet Transceiver, Mar. 1990, Advanced Micro Devices Inc., Sunnyvale, Calif.
Draft Supplement to IEEE Standard 802.3 CSMA/CD Access Method and Physical Layer Specifications, P802.3I/D11, Jun. 28, 1990, IEEE, New York.
LXT902 Ethernet Twisted-Pair Media Attachment Unit, Jul. 1990, Level One Communications, Inc.
LXT901 Universal Ethernet Interface Transceiver, Feb. 1991, Level One Communications, Inc.

*Primary Examiner*—Curtis Kuntz
*Assistant Examiner*—Tesfaldet Bocure
*Attorney, Agent, or Firm*—Merchant, Gould, Smith, Edell, Welter & Schmidt

[57] ABSTRACT

A data communication system employing predetermined equalized waveforms for transmit equalization is disclosed. Serial NRZ data is received from a network controller and utilized to select from memory its equivalent as predistorted and filtered Manchester encoded data. Predetermined waveforms in memory are representative of the analog waveform produced when predistorted digital Manchester encoded data is passed through a high order transmit filter. Data from memory drives a digital to analog converter (DAC) to reconstruct the waveforms into analog form. A line driver having an integrated single pole low pass filter impresses the equalized waveform on to the transmission line.

11 Claims, 8 Drawing Sheets

SYSTEM AND METHOD EMPLOYING PREDETERMINED WAVEFORMS FOR TRANSMIT EQUALIZATION

FIELD OF THE INVENTION

This invention relates generally to problems in data communication systems having lossy transmission media, and more particularly, to a system and method which employs predetermined waveforms as a means for transmit equalization to overcome these problems.

BACKGROUND OF THE INVENTION

It is known in the art of data communications that transmission of data encoded in a nonreturn to zero (NRZ) format forms an asymmetrical waveform around the zero reference generating a bias on the transmission line. The bias varies as a function of the data pattern causing the zero crossing points to fluctuate. Fluctuations in the zero crossing points are reflected as data jitter in a remotely located receiver. It is also known that coding data in a biphase format, such as the Manchester code, provides a balanced transmitted waveform which does not contain a net DC bias. The so-called biphase code provides for a transition in each baud period so that the transmitted signal is balanced. In other words, the time averaged value on the transmission line is zero. The use of such a biphase code has problems associated with it as well. Conventional transmission lines, such as a twisted-pair cable, exhibit a lossy or low pass frequency impedance which intensifies with increasing cable length. In accordance with the biphase encoding format, adjacent data symbols having different logic values produce a waveform which shifts between two frequencies (f and f/2) so as to achieve a transition in every baud period. Shifting between frequencies produces a so-called fat bit for different adjacent data symbols and a so-called skinny bit for like adjacent data symbols. The frequency dependent impedance of the transmission line disparately distorts the skinny bits in comparison with the fat bits. Alternatively expressed, the amplitude and phase of the waveform at frequency f is distorted more severely than that at a frequency f/2. The unequal treatment causes adjacent symbols to spread into each other forming distortion as intersymbol interference. Predistortion, commonly called transmit equalization, ameliorates the dissimilar effects of the transmission line by lopping off a portion of the fat bit so as to reduce its relative power content to that of a skinny bit.

In general, another concern with transmitting digital data is the high frequency composition of the sharp transitional edges. Before transmission, the waveform is typically passed through a low pass transmit filter. The transmit filter rounds off the sharp edges to suppress electromagnetic radiation and limits the frequency spectrum so as to minimize intersymbol interference. The properties of the transmit filter are selected such that zero crossing points of adjacent data symbols at bauds T−1 and T+1 coincide in time with the sample point of a data symbol at baud T. In this manner, unwanted contributions from adjacent symbols are minimized, substantially reducing the intersymbol interference.

Referring now to FIGS. 1A and 1B, are simplified block diagram illustrating the prior art approach to data transmission utilizing equalization by predistortion. NRZ data is received by an attachment unit interface (AUI) transmit receiver 10 in a communication network. Among other functions, the AUI transmit receiver 10 conditions and level shifts the received signals to an appropriate logic level. Control and encoding logic 12 compares adjacent data symbols for like logic levels and converts the data from NRZ to a Manchester encoding format. Data comparison outputs of logic circuitry 12 selectively energize buffers 14–20. Buffers 14 and 18 are coupled through a resistor having a low ohmic value (R) and through a transmit filter 22 to a primary winding of a transformer 24. Buffers 16 and 20 are wired ORed with buffers 14 and 18, respectively, through a resistor having a high ohmic value, typically on the order of ten times R. When energized, buffers 14 and 18 impress a fullstep voltage substantially spanning the supply rails across the primary winding of transformer 24. Buffers 16 and 20 when energized, impress a halfstep voltage across the primary winding of transformer 24 having a span between the negative rail and an intermediate value between the rails. Buffers 14 and 20 are selectively energized when logic circuitry 12 detects two adjacent data symbols of the same value. Likewise, buffers 16 and 20 are energized when logic circuitry 12 detects two adjacent data symbols having different values. A staircase-like waveform results across nodes 26–26' when a stream of data containing like and different data symbols is detected by logic circuitry 12.

Reference is now made to FIG. 2 for an illustration of the relationships between the various waveforms. Data in NRZ format 28 is received by the AUI transmit receiver 10. Logic circuitry 12 internally converts the data into a Manchester format 30. Logic circuitry 12 selectively energizes buffers 14–20 to impress the staircase waveform 32 across nodes 26–26'. Transmit filter 22, typically a high order low pass filter having a high Q, smooths out the staircase waveform 32 to a limited frequency spectrum waveform 34. To achieve a high order, high Q filter at the frequencies of interest, transmit filter 22 must be realized with passive elements. The passive embodiment is space consuming, subject to wide variances in component values and does not lend itself to effective consolidation onto an integrated circuit.

In accordance with the principles of the present invention, a system and method for transmit equalization is disclosed without the need for an external filter or external filter components. The invention reduces harmonic distortion and improves zero crossing jitter without space consuming, wide tolerance passive components and is completely realized in silicon circuitry. The present invention provides transmit equalization and suppression of electromagnetic radiation utilizing precoded waveforms in memory. Predetermined waveforms reduces system complexity, decreases system cost and increases system reliability.

SUMMARY OF THE INVENTION

A data communications system employing predetermined waveforms for providing transmit equalization of predistorted biphase encoded data is disclosed. The system comprises a sequencer, memory for storing the predetermined waveforms, a multiplexer, a de-skewing latch, a differential current digital to analog converter (DAC), and a differential driver with a single pole low pass filter. The sequencer divides a master clock by N to generate a transmit clock as a synchronous reference for a network controller. Synchronous to the transmit clock, the network controller transfers NRZ data, a transmit enable signal and an initiate link integrity test signal to the sequencer. The sequencer latches two adjacent NRZ data bits and utilizes them to select a mode within the multiplexer. The multiplexer is stepped over seven time segments spanning the baud period of the selected mode by the sequencer. The multiplexer channels data from the memory to the de-skewing latch which in turns drives the differential current DAC. The differential current is converted into a voltage and smoothed by the line driver which drives the transmission line.

For a better understanding of the invention, as well as other objects and further features thereof, reference is made to the following detailed description of the preferred embodiment taken in conjunction with accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1A:
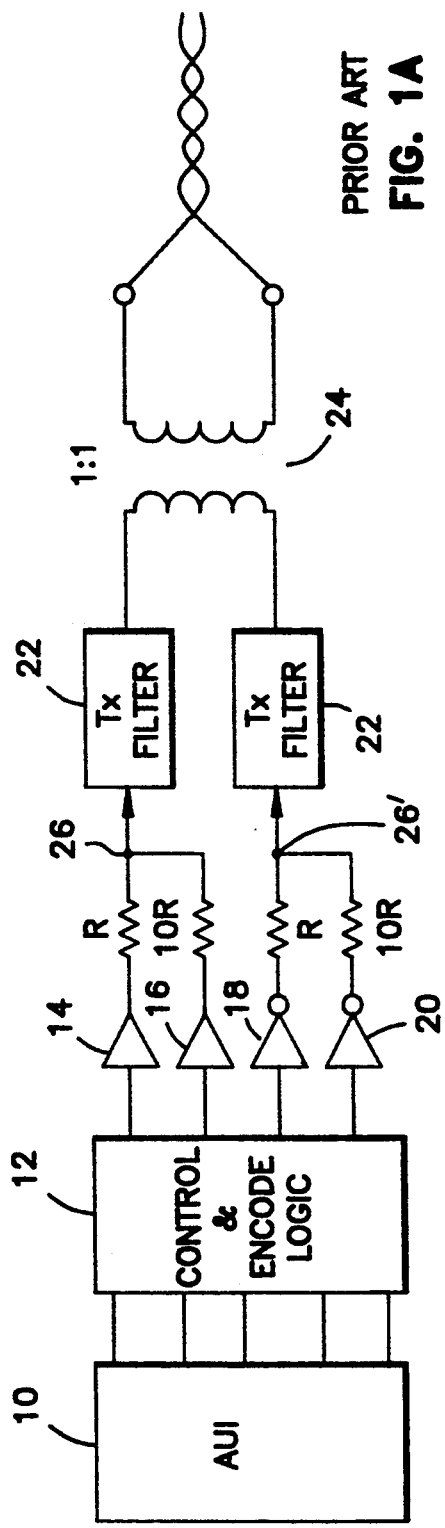
FIGS. 1A and 1B are simplified block diagram reflecting a prior art scheme for transmit equalization.
Figure 1B:
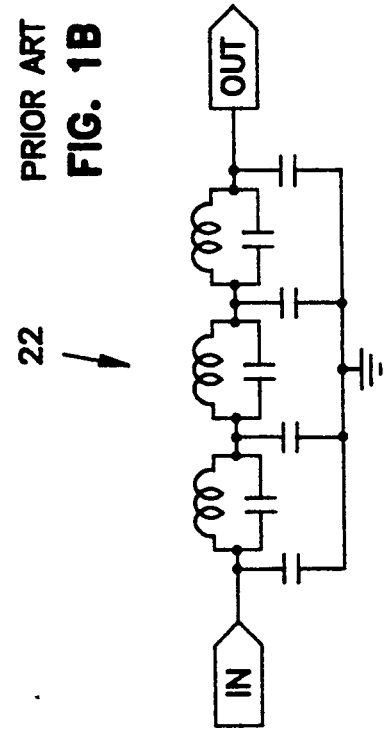
Figure 2:
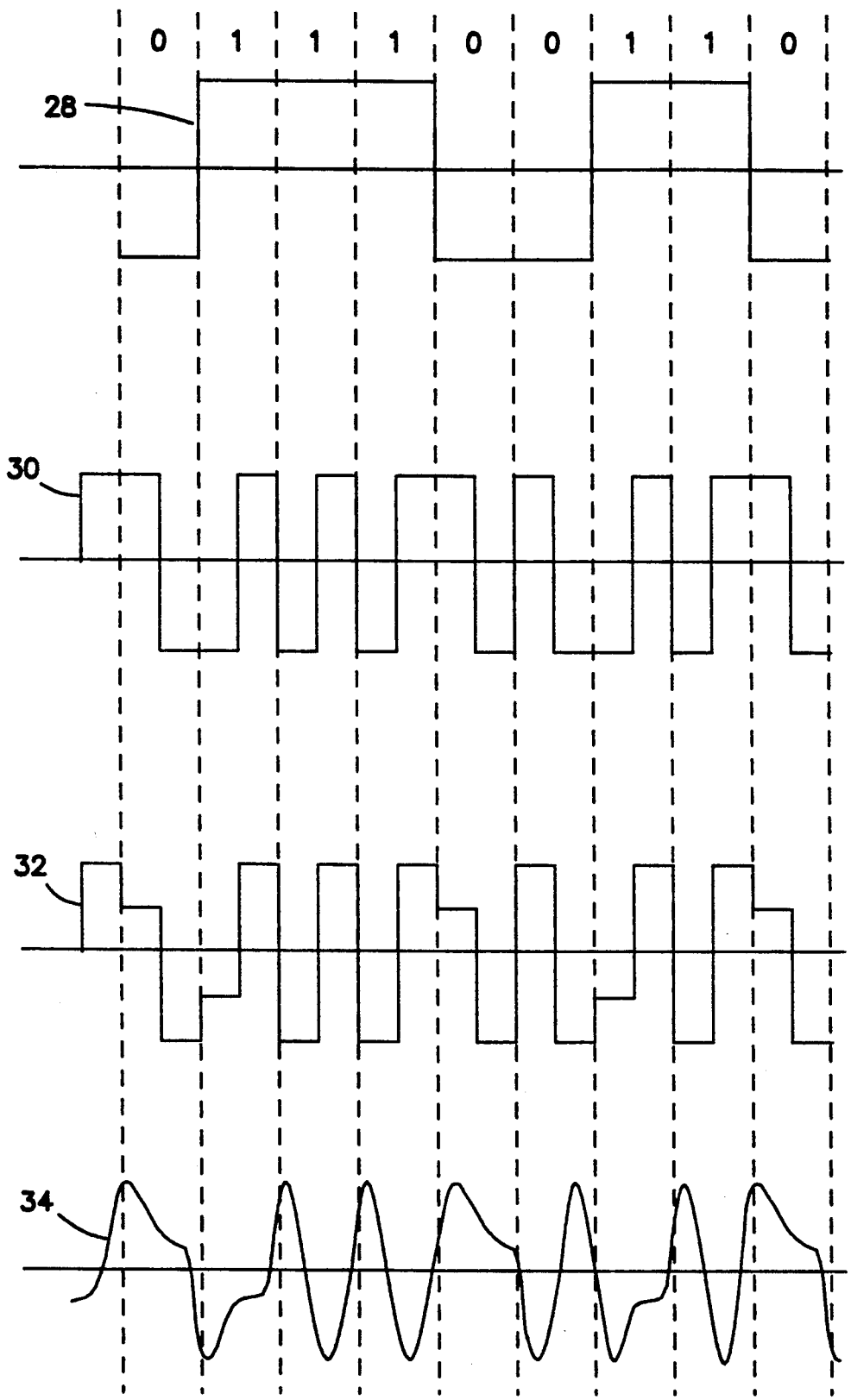
FIG. 2 is a timing diagram illustrating the relationship of waveforms generated within the prior art scheme.

Before describing the particular system and method employing predetermined waveforms for transmit equalization, it should be noted that the invention resides primarily in a novel structural combination of conventional signal processing circuits and not in the particular detailed configuration thereof. Accordingly, the structure, control and arrangement of these conventional circuits have been illustrated in the drawings by readily understandable block and schematic representations. In order not to obscure the disclosure with structural details which will be readily apparent to those skilled in the art having the benefit of the description herein, only those specific details that are pertinent to the present invention are illustrated. It is to be understood that other embodiments may be utilized and structural changes may be made without departing from the scope of the present invention.

Figure 3:
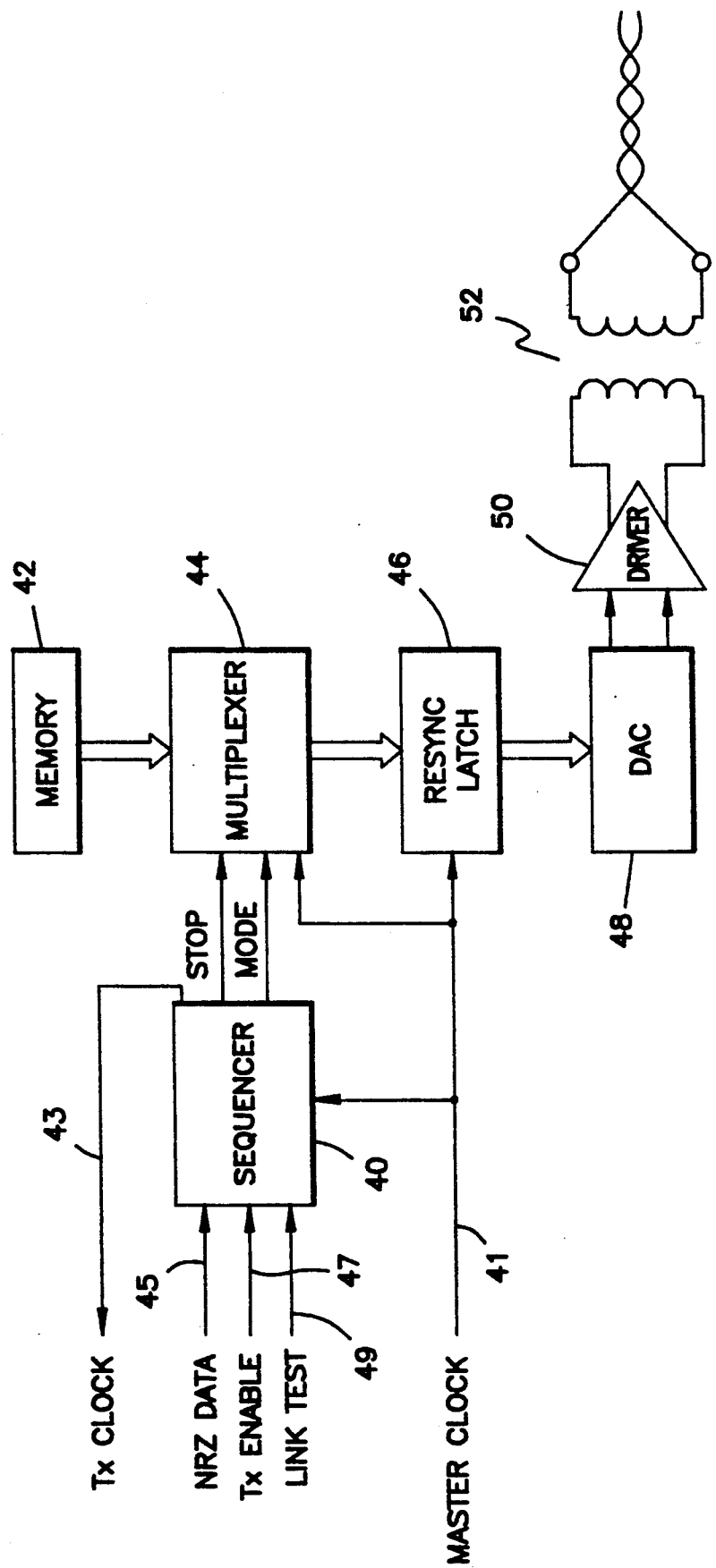
FIG. 3 is a simplified block diagram illustrating a data transmission system in accordance with the present invention.

Referring now to FIG. 3, a block diagram illustrates a data transmission system in accordance with the present invention. The system comprises sequencer 40, memory 42, multiplexer 44, de-skewing latch 46, digital to analog converter (DAC) 48, and driver 50. Master clock input 41 to sequencer 40 is divided by N to generate a transmit clock (TX clock) 43 as a synchronous reference for a network controller (not shown). Sequencer 40 receives from the network controller NRZ data on input 45, transmit enable (TX enable) signal on input 47 and initiate link integrity test (Link test) signal on input 49. Two adjacent NRZ data bits are latched within sequencer 40 to derive a Manchester code. The Manchester code is utilized to mode select multiplexer 44. Multiplexer 44 is stepped over N time segments spanning the baud period of the selected mode by sequencer 40. Memory 42 is coupled to multiplexer 44 and contains data representing a plurality of predetermined waveforms representative of a desirous output response by a hypothetical transmit filter when excited with predistorted Manchester encoded data. The waveforms represent the respective outputs from a hypothetical transmit filter in response to input stimulation from predistorted Manchester data patterns 0/0, 0/1, 1/0, 1/1, a link integrity test pulse and an idle extension pulse. The predetermined waveforms are temporally quantized over N time segments coinciding with the N segments generated by sequencer 40.

Applicants found through simulation and experimentation that a transmit filter having a raised-cosine characteristic with a fifty percent roll-off suitably performs in a network having twisted pair transmission media. Those skilled in the art will readily recognize other filter varieties may be more suitable for alternative transmission media. Applicants also found through simulation and experimentation that a value of N equal to seven (seven times over-sampling) provides sufficient temporal resolution and one part in thirty-two amplitude resolution ($+/-$ sixteen) sufficient to stay within jitter tolerances for networks employing twisted pair media. Standards set forth by the Institute of Electrical and Electronic Engineers in proposed supplement (P802.3I/D11) for 10Base-T networks are incorporated herein by reference.

The output of multiplexer 44 is coupled to the input of latch 46. Latch 46 de-skews the parallel bits representing the waveform amplitude and encodes them for use with differential current DAC 48. The output of latch 46 drives DAC 48 producing a differential analog current proportional to the digital contents of latch 46. The differential current from DAC 48 is converted into a proportional differential voltage by driver 50 which drives a transformer 52 in a balanced fashion.

Figure 4:
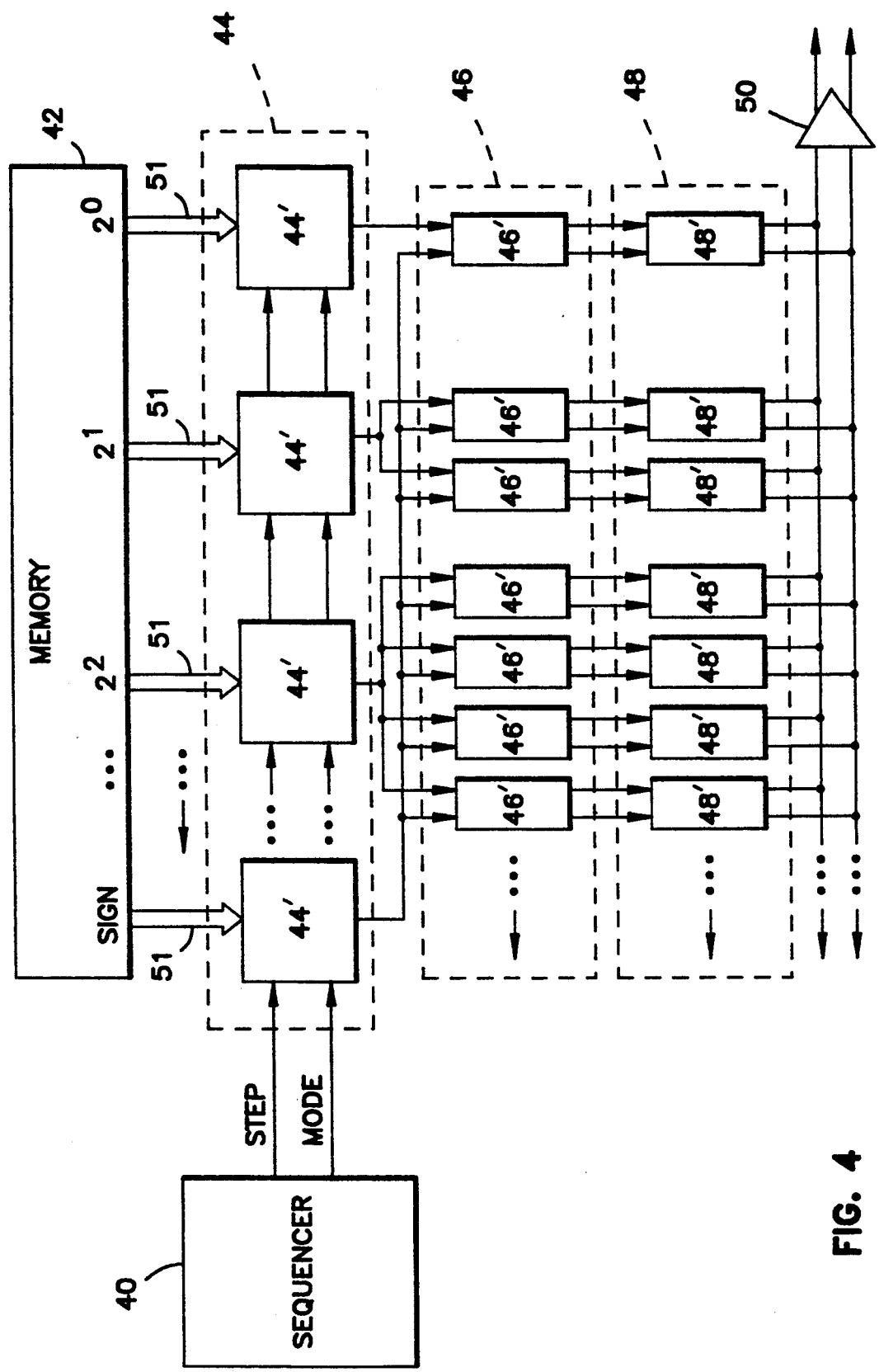
FIG. 4 is a more detailed block diagram of the invention depicted in FIG. 3.

Reference is now directed to FIG. 4, wherein the invention depicted in FIG. 3 is illustrated in more detail. Multiplexer 44 comprises a plurality of multiplexer cells. Multiplexer cell 44' has a plurality of inputs on bus 51 coupled to a plurality of bits in memory 42. Each multiplexer cell 44' channels a significant digit from memory 42 for defining the waveform amplitude. In the preferred embodiment, multiplexer 44 comprises five cells for defining the amplitude in one part of thirty-two. Those skilled in the art having the benefit of the description herein, will readily recognize that the amplitude resolution may be expanded by adding additional cells to multiplexer 44.

Latch 46 comprises a plurality of latch cells. N latch cells are required for each multiplexer cell 44' where N is the value of the digit for which multiplexer cell 44' channels. For example, the fourth significant digit ($2^3$) requires eight latch cells and the third significant digit ($2^2$) requires four latch cells. Latch cell 46' has a first input coupled to the output of the multiplexer cell representing the given sign and a second input coupled to the output of a multiplexer cell representing the given digit. The output of latch cell 46' is coupled to a corresponding DAC cell 48'. DAC cell 48' generates a uniform differential current in response to sign and on/off information received from latch cell 46'. The differential currents of all the DAC cells are summed together to form an aggregate current having an amplitude representative of the stored waveform. The differential current is converted into a proportional voltage by line driver 50.

Figure 5:
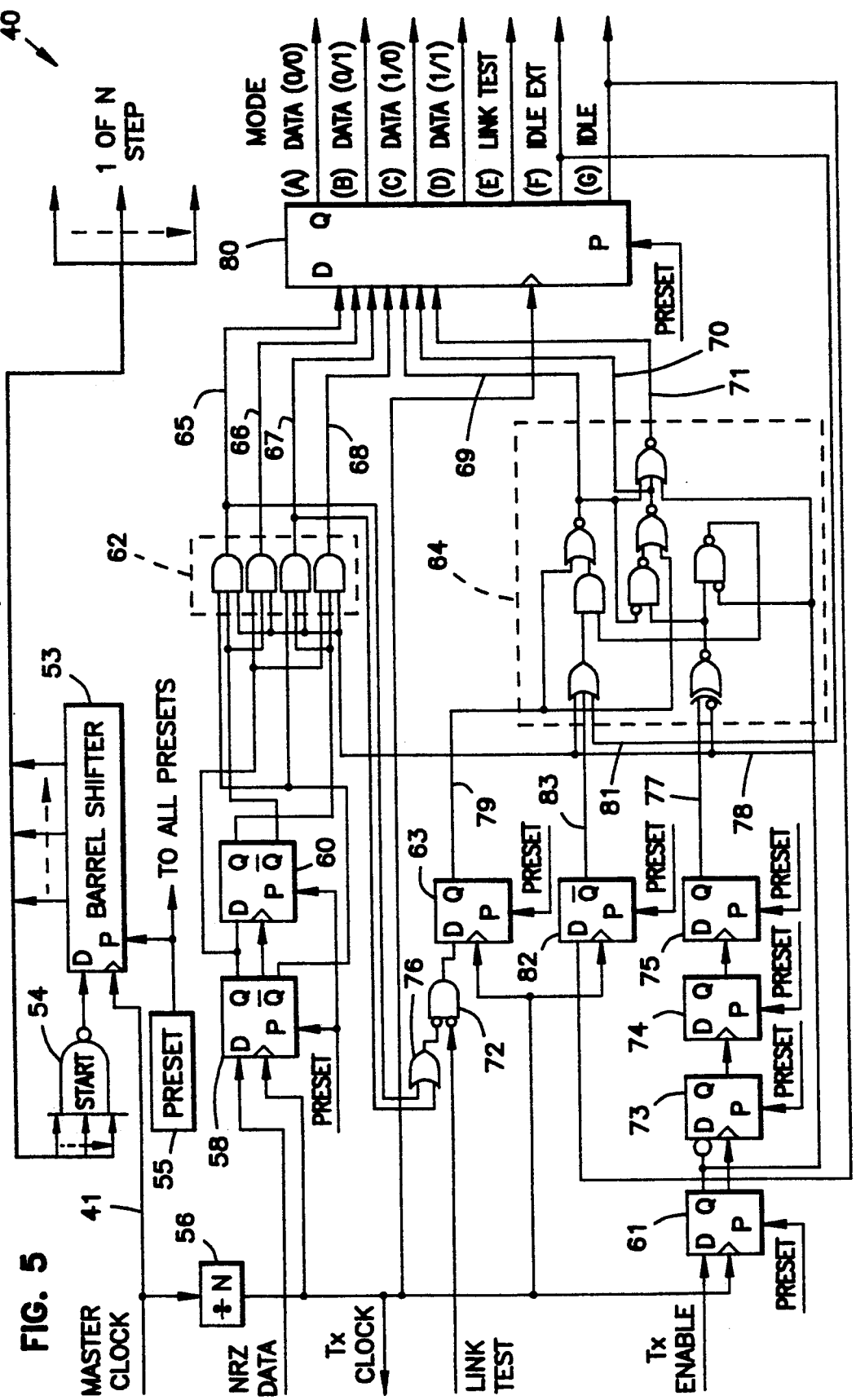
FIG. 5 is a schematic illustration of the sequencer depicted in FIG. 4.

Reference is now directed to FIG. 5, wherein sequencer 40 is schematically illustrated. A master clock input 41 having a frequency N times the baud rate is applied to clock input on barrel shifter 53. Barrel shifter 53 comprises N cascaded Flip-Flops, i.e. stages, synchronously clocked by master clock 41. Barrel shifter 53 has N outputs coupled to multiplexer 44 (shown in FIG. 3) for sequencing it through N steps. On power up or reset, preset logic 55 presets the outputs of stages two through N to an inactive state and the output of stage one to an active state. Master clock 41 shifts the active state through the barrel shifter 53 sequentially activating outputs 1 through N. NAND gate 54, having inputs coupled to the barrel shifter 53 outputs, re-initiates the sequencing on every Nth master clock pulse by setting the stage one output to an active state. Master clock 41 is also coupled to a divide-by-N divider 56 for producing a transmit clock (TX clock) for system synchronization. TX clock is routed to a network controller (not shown) such as but not limited to, an Ethernet type controller. Synchronous to TX clock, the network controller produces a transmit enable signal (TX enable), NRZ data and an initiate link integrity test signal. The NRZ data is applied to the D input of F/F 58. The Q output of Flip-Flop (F/F) 58 is cascaded to the D input of a second F/F 60. TX clock registers the data into F/F 58 and F/F 60, representing the present data bit and the previous baud bit respectively. The TX enable signal is applied to the D input of F/F 61 and registered to the TX clock therein. The respective Q and /Q outputs of F/F 58 and F/F 60 together with the Q output of F/F 61 are gated together in decode logic 62. Decode logic 62, in combination with decode logic 64, generates seven mutually exclusive mode select signals for selecting one of seven data patterns stored in memory 42. For example, when F/F 58 and F/F 60 indicate a 0/0 data pattern, select line 65 is asserted. Likewise, when F/F 58 and F/F 60 indicate data patterns 0/1, 1/0, and 1/1, select lines 66, 67 and 68 are respectively asserted. The initiate link integrity test input (link test) is coupled to F/F 63 through AND gate 72. Select lines 65 and 67, for selecting data patterns 0/0 and 1/0, are coupled through OR gate 76 to a second input on AND gate 72. Q outputs 77, 78 and 79 from F/Fs 75, 61 and 63 and the /Q output 83 from F/F 82 are coupled to decode logic 64. A data pattern representing the link integrity test pulse is selected by decode logic 64 with the assertion of select line 69. Line 69 is asserted when link test input is active and select lines 65 and 67 are not. Cascaded F/Fs 73-75 are driven by F/F 61 to generate a reference pulse on line 77 having a width equal to at least three baud periods. The reference pulse on line 77 in combination with the output of F/F 61 on line 78 and the registered link test signal on line 79, are decoded by logic 64 to generate mode select lines 71 and 70 for selecting idle and idle extension data patterns respectively. Select lines 70 and 71 are coupled to memory 42 (shown in FIG. 3) for selecting those blocks of memory which contain data representing idle and idle extension pulses. Mutually exclusive mode select lines 65-71 are resynchronized with TX clock in F/F array 80. The resynchronized link test signal 81 from F/F array 80 is also coupled to decode logic 64 for selecting one of the mutually exclusive mode select lines 65-71. Those skilled in the art will readily recognize that decoding logic 62 and 64 may be realized with other combinational schemes without departing from the scope of the present invention.

Figure 6:
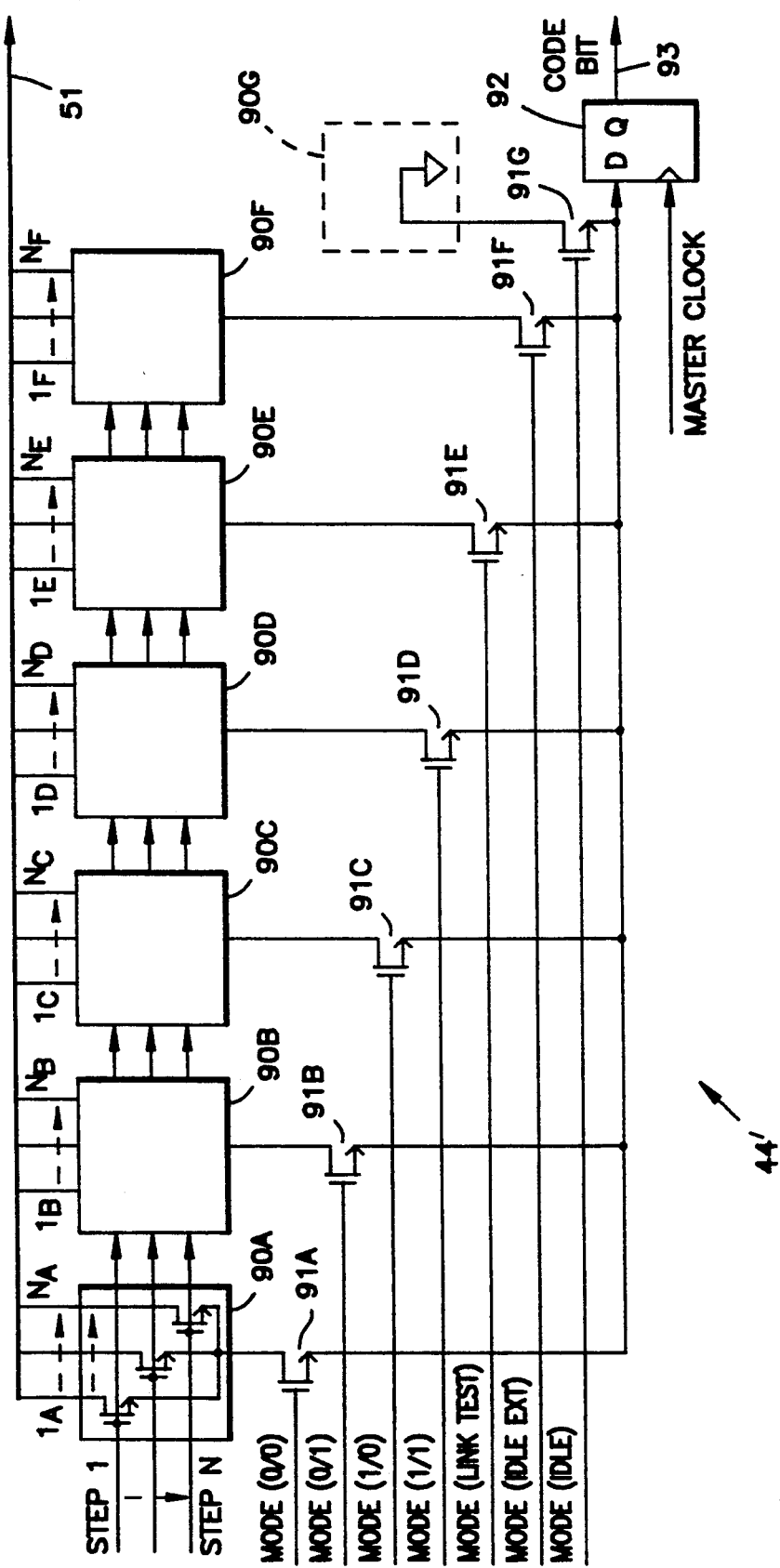
FIG. 6 is a schematic illustration of a multiplexer cell as depicted in FIG. 4.

Reference is now made to FIG. 6 wherein a multiplexer cell 44' is schematically illustrated. Barrel shifter 53 in sequencer 40 sequences a plurality of switch arrays 90A-90F through steps 1 through N. Each switch array 90A-90F has N drains coupled to a block of N bits representing the amplitude of each data pattern over the baud period and has commonly connected sources coupled to a mode select switch. Mode select switches 91A-91F have their drains coupled to the commonly connected sources of switch arrays 90A-90F respectively. The drain of mode select switch 91G is permanently tied to a zero common mode voltage and is unaffected by the sequencing of barrel shifter 53. Mode select switches 91A-91G are selectively switched by mode select signals latched by F/F array 80 in sequencer 40. The commonly connected sources of mode select switches 91A-91G are coupled to a D input of F/F 92. F/F 92 re-synchronizes the D input to the master clock providing a significant digit on line 93.

Figure 7A:
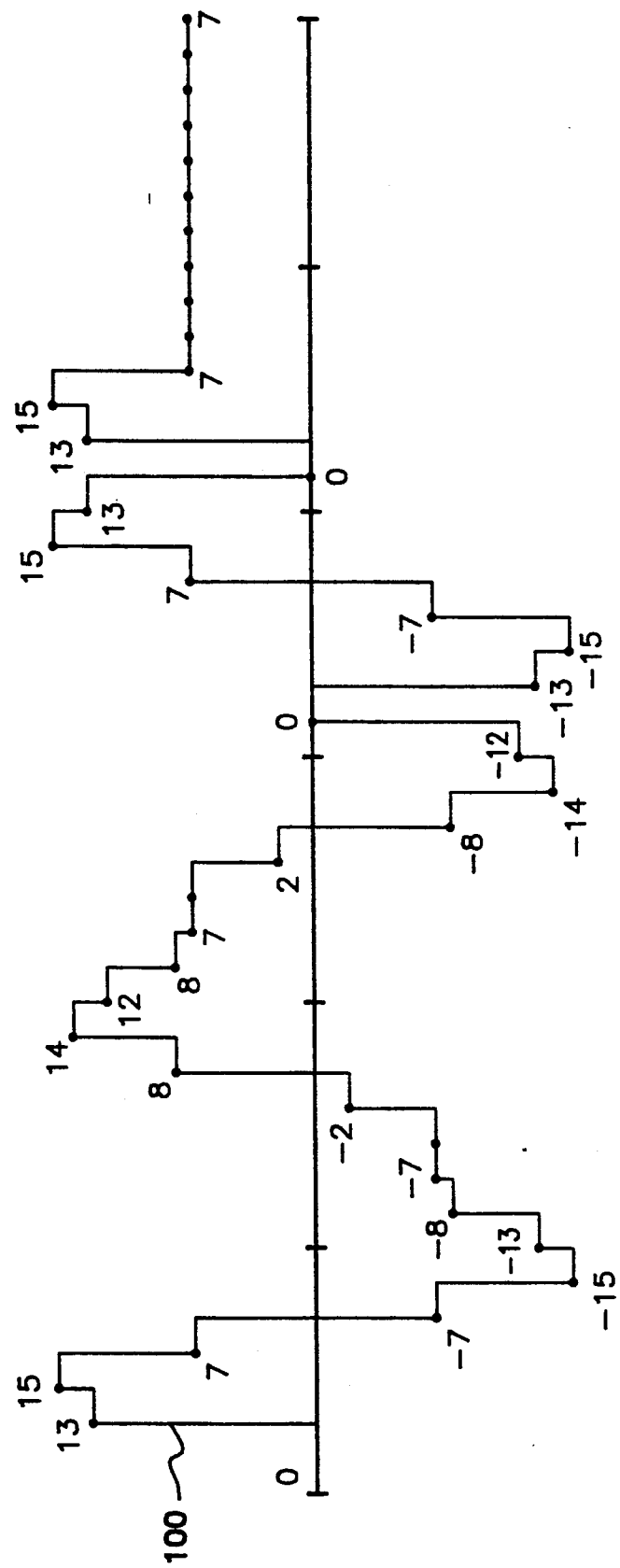
FIGS. 7A and 7B are a memory map of the memory depicted in FIG. 4 and the relationship to an output waveform.
Figure 7B:
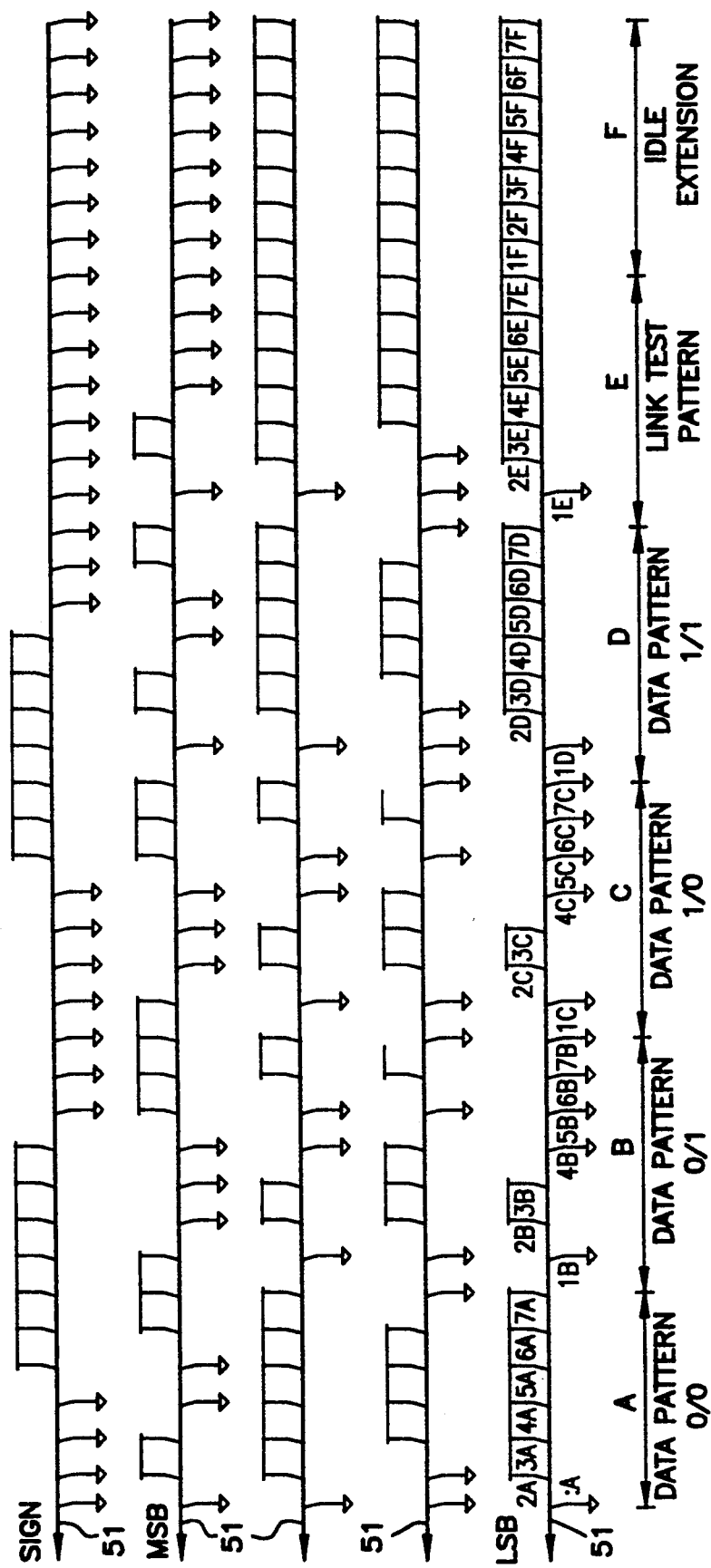

Referring now to FIGS. 7A and 7B, are map of memory 42 and its relationship to the stored waveforms is illustrated. Bus 51, for each significant digit (sign, MSB-LSB), is routed to its respective multiplexer 44'. Bus 51 has six blocks (A-E) of seven bits which represent the six waveform types. Signal 100 represents the current output of DAC 48 for the sequence of 0/0, 0/1, 1/0, 1/1, link test, and idle extension. The output of DAC 48 for an idle pulse is zero since the drain of mode select switch 91G is tied to a zero common mode voltage. Line driver 50 includes a simple first order low pass filter to smooth the sampling transitions in signal 100.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data communication system employing transmit equalization comprising:
   a) a sequencer for receiving data in a non-return to zero format and providing a mode select output B and a step select output in response thereto;
   b) memory for storing data representing a plurality of predetermined waveforms;
   c) a multiplexer having a first input coupled to the step select output, a second input coupled to the mode select output, an input bus coupled to the memory and an output bus for providing data representing a select waveform from the memory in response to the step and mode select outputs;
   d) a latch having an input coupled to the output bus and an output for de-skewing the data representing the select waveform;
   e) a differential digital to analog converter having an input coupled to an output of the latch and providing a differential analog current output proportional to the select waveform; and f) driver means including low pass filter means having a differential input coupled to the current output for impressing an analog voltage onto a transmission line.

2. The system in accordance with claim 1 wherein the sequencer further comprises a transmit enable input and an initiate link integrity test input for providing additional mode and step select outputs.

3. The system in accordance with claim 1 wherein the predetermined waveforms in memory are representative of respective predistorted biphase encoded waveforms passed through a transmit filter.

4. The system in accordance with claim 3 wherein the transmit filter has a raised-cosine characteristic with a 50 percent roll-off.

5. The system in accordance with claim 1 wherein the predetermined waveforms in memory are over-sampled N times with respect to a baud rate of the received data.

6. The system in accordance with claim 1 wherein the sequencer divides a master clock by N for generating a transmit clock as a synchronous reference for the received data.

7. A system for transmitting predistorted Manchester encoded data comprising:
   a) a barrel shifter for sequencing a multiplexer through N steps over one baud period;
   b) a first and a second flip/flop coupled in a cascade manner for receiving and storing two consecutive data bits;
   c) decoding means for decoding the first and second flip/flop outputs into an one of four select signal;
   d) a multiplexer having an output for providing select data and an input coupled to a data bus of a memory containing predetermined data, the multiplexer having N rows for at least four columns, the rows selectable by the barrel shifter, the columns selectable by the decoding means;
   e) digital to analog conversion means having an input coupled to the multiplexer output and an output for providing an analog signal representative of the predetermined data; and
   f) line driving means having an input coupled to the analog signal and output for driving a transmission line.

8. A method for transmit equalization comprising the steps of:
   a) receiving input data in a non-return to zero format and providing multiplexer control signals in response thereto;
   b) storing output data representing a plurality of predetermined waveforms;
   c) multiplexing the output data representing one of the predetermined waveforms onto a bus;
   d) de-skewing the output data on the bus;
   e) converting the output data on the bus into a differential analog signal; and
   f) impressing the analog signal onto a transmission line.

9. The method in accordance with claim 8 wherein the step of providing multiplexer control signals further comprises the step of providing additional control signals in response to a transmit enable input and an initiate link integrity test input.

10. The method in accordance with claim 8 wherein the step of storing data representing a plurality of predetermined waveforms further comprises the step of over-sampling N times with respect to a baud rate of the received data, wherein N represents the number of samples in one baud period.

11. The method in accordance with claim 8 wherein the step of receiving data in a non-return to zero format further comprises the step of generating a transmit clock as a synchronous reference for the received data.

* * * * *